Sept. 19, 1939.  F. S. DENISON ET AL  2,173,801
AUTOMATIC RESET MECHANISM
Filed Nov. 23, 1936

Inventors
Frederick S. Denison
Albert E. Baak
By
George H. Fisher
Attorney

Patented Sept. 19, 1939

2,173,801

UNITED STATES PATENT OFFICE 2,173,801

AUTOMATIC RESET MECHANISM

Frederick S. Denison and Albert E. Baak, Minneapolis, Minn., assignors to Minneapolis-Honeywell Regulator Company, Minneapolis, Minn., a corporation of Delaware Application November 23, 1936, Serial No. 112,335

16 Claims. (Cl. 236—74)

This invention relates to automatic reset mechanism in general and more particularly to that type of mechanism as applied to a follow-up control system.

It is an object of this invention to provide a follow-up control system for controlling the value of a condition, along with a novel reset or load compensation mechanism for altering the action of the follow-up means of the control system to maintain the value of the condition to be controlled at the desired normal value regardless of changes in load.

Another object of this invention is to provide a novel reset mechanism utilizing a ball governor arrangement, along with a brake mechanism which may be adjusted as an incident to deviation of the condition to be controlled from the desired normal value.

Other objects and advantages will become apparent to those skilled in the art upon reference to the accompanying specification, claims and drawing.

Figure 1:
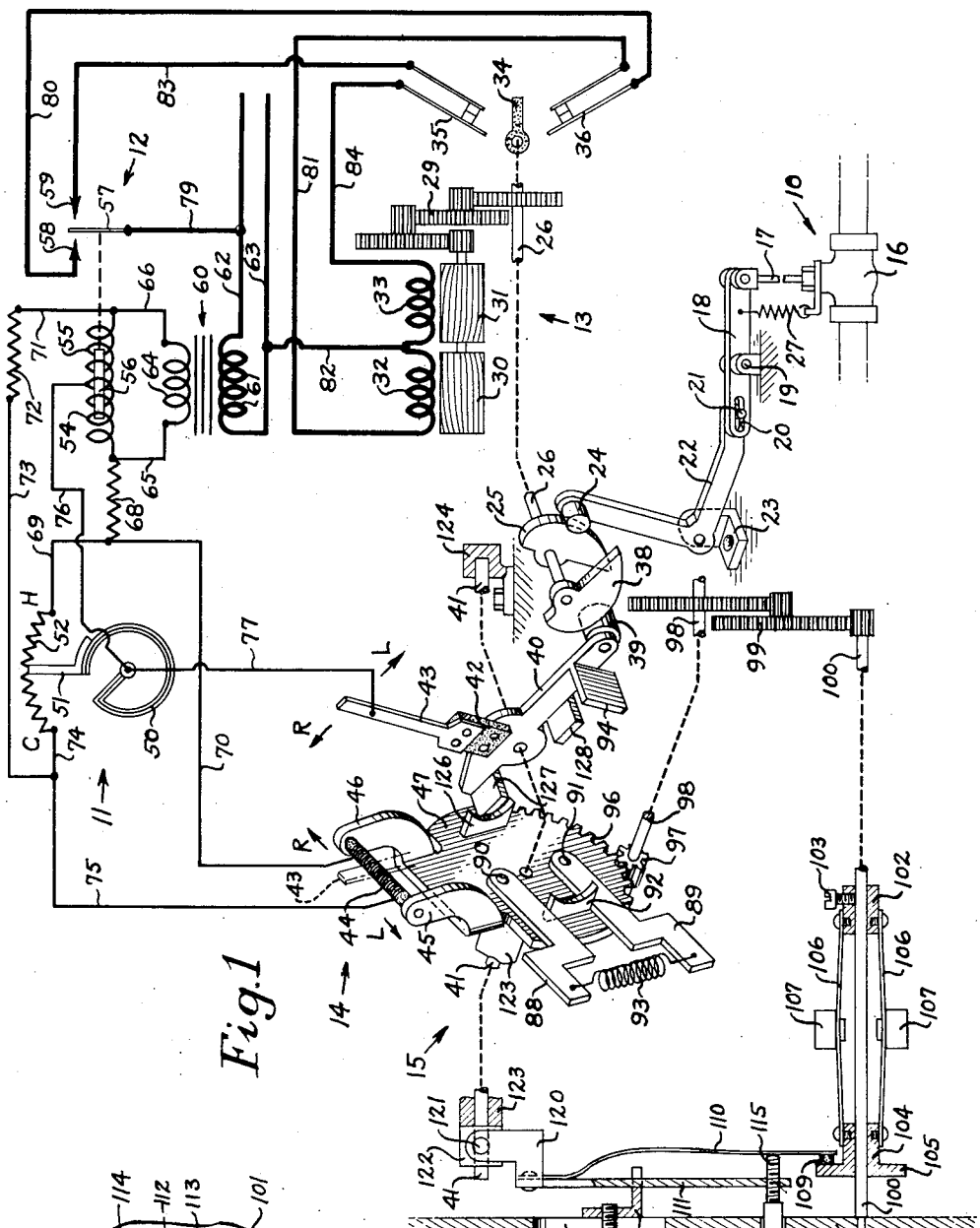

For a more thorough understanding of this invention reference is made to the accompanying single sheet of drawings, in which:

Figure 1 diagrammatically shows a follow-up control system and a reset or load compensation mechanism, the reset or load compensation mechanism being opened up into an exploded view to more clearly show the construction thereof.

Figure 2:
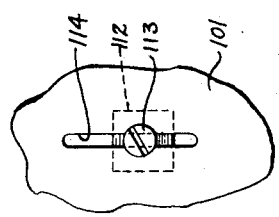

Figure 2 is a partial view showing a detail of construction.

Referring now to Figure 1 of the drawing, a device to be positioned in a plurality of positions for controlling the value of a condition is generally designated at 10. A control means the state of which is varied in accordance with changes in the value of the condition to be controlled is generally designated at 11. The control means 11 operates a relay generally designated at 12 which in turn operates a motor generally designated at 13. The motor 13 positions the device 10 and also operates a follow-up means generally designated at 14. The follow-up means 14 also operates on the relay 12 to form a follow-up control system. A reset or load compensation mechanism generally designated at 15 alters the action of the follow-up means 14 to maintain the value of the condition at the desired normal value regardless of changes in load.

Although the system of this invention may be utilized for controlling any desired condition, it is shown for purposes of illustration as controlling a temperature condition and more particularly the temperature of a space, not shown. Therefore, the condition controlling device 10 is shown to comprise a valve 16 for controlling the supply of heating fluid to the space. Valve 16 may be operated by a valve stem 17 which is connected to one end of a lever 18 pivoted upon a stationary pivot 19. The other end of the lever 18 carries a slot 20 into which extends a pin 21 carried by a bell crank lever 22. The bell crank lever 22 is pivoted upon a stationary pivot 23. The bell crank lever 22 carries a cam follower 24 which is adapted to engage a cam 25 carried by a shaft 26 of the motor 13. A spring 27 biases the valve 17 towards a closed position and holds the cam follower 24 in engagement with the cam 25. The shaft 26 is operated through a reduction gear train 29 by motor rotors 30 and 31. The rotors 30 and 31 are in turn operated by field windings 32 and 33 respectively. The arrangement is such that when the field winding 32 is energized the cam 25 is rotated in such a direction as to cause opening movement of the valve 16 and when the field winding 33 is energized, the cam 25 is rotated in the opposite direction to cause closing movement of the valve 16. The shaft 26 also carries an abutment member 34 preferably made of insulating material for opening limit switches 35 and 36 when the valve 16 is moved to either an extreme closed position or an extreme open position, respectively.

The shaft 26 also carries a cam 38 which is engaged by a cam follower 39 carried by a lever 40. The lever 40 is rigidly secured to a shaft 41 which is journaled in a suitable bearing 124. A slider 43 is connected to the lever 40 by an insulating pad 42 and the slider 43 is adapted to slide across a potentiometer resistance element 44. The resistance element 44 is carried by upturned lugs 45 and 46 formed on a plate 47. The plate 47 is rotatably mounted on the shaft 41. When the valve 16 is moved towards an open position the slider 43 is moved to the right in the direction indicated by the arrow designated R and when the valve 16 is moved towards a closed position the slider 43 is moved to the left in the direction indicated by the arrow designated L. The cooperation of the slider 43 with the resistance element 44 is shown by dot and dash lines. The slider 43 and the resistance element 44 form a balancing potentiometer the operation of which will be pointed out more fully hereafter.

The control means generally designated at 11 is shown to be a thermostatic control means having a thermostatic element 50 responsive to variations in space temperature. The thermostatic element 50 operates a slider 51 with respect to a potentiometer resistance element 52. The slider 51 and the resistance element 52 form a control potentiometer. Upon a decrease in space temperature the slider 51 is moved to the left in the direction indicated by the character C and upon an increase in space temperature the slider 51 is moved to the right in the direction indicated by the character H. When the space temperature is at the desired normal value the slider 51 is in a mid position as shown in Figure 1, and this represents the normal state of the control means.

The relay generally designated at 12 may comprise relay coils 54 and 55 for influencing an armature 56 which is suitably connected to a switch arm 57. The switch arm 57 is adapted to engage spaced contacts 58 and 59. When the relay coil 54 is energized more than the relay coil 55 the switch arm 57 is moved into engagement with the contact 58 and when the relay coil 55 is energized more than the relay coil 54 the switch arm 57 is moved into engagement with the contact 59. When the relay coils 54 and 55 are equally energized the switch arm 57 is maintained spaced midway between the contacts 58 and 59 as shown in Figure 1. Power is supplied to the relay 12 by means of a step-down transformer 60 having a primary 61 connected across line wires 62 and 63 and a secondary 64. One end of the secondary 64 is connected to the left end of the relay coil 54 by a wire 65 and the other end of the secondary 64 is connected to the right end of the relay coil 55 by means of a wire 66. The adjacent ends of the relay coils 54 and 55 are connected together. By reason of these connections the relay coils 54 and 55 are connected in series and across the secondary 64.

The left end of the relay coil 54 is connected by a protective resistance 68 and wires 69 and 70 to the right ends of the control potentiometer resistance element 52 and the balancing potentiometer resistance element 44. The right end of the relay coil 55 is connected by a wire 71, a protective resistance 72 and wires 73, 74 and 75 to the left ends of the control potentiometer resistance element 52 and the balancing potentiometer resistance element 44. The junction of the relay coils 54 and 55 are connected by wires 76 and 77 to the slider 51 of the control potentiometer and to the slider 43 of the balancing potentiometer. By reason of these wiring connections it is seen that the control potentiometer and the balancing potentiometer are connected in parallel with the series connected relay coils 54 and 55 and across the secondary 64.

Assume now the parts in the position shown in Figure 1, and also assume that the plate 47 carrying the balancing potentiometer resistance element 44 remains stationary, that the space temperature is at the desired normal value and that the valve 16 is in a mid position for supplying just the correct amount of heat to make up for the heat losses from the space. Upon a decrease in space temperature the slider 51 moves to the left in the direction indicated by the character C and by reason of the above referred to parallel relationship the relay coil 55 is partially short-circuited to decrease the energization thereof and increase the energization of the relay coil 54. As a result of unequal energization of the relay coils 54 and 55 the switch arm 57 is moved into engagement with the contact 58 to complete a circuit from the line wire 62 through wire 79, switch arm 57, contact 58, wire 80, limit switch 36, wire 81, field winding 32 and wire 82 back to the other line wire 63. Completion of this circuit energizes the field winding 32 to move the valve 16 towards an open position to increase the supply of heat to the space. Operation of the motor 13 to move the valve 16 towards an open position also causes right-hand movement of the slider 43 of the balancing potentiometer and this right-hand movement of the slider 43 partially short-circuits the relay coil 54 to decrease the energization thereof and increase the energization of the relay coil 55. When the slider 43 has moved sufficiently far to the right to rebalance the energizations of the relay coils 54 and 55 the switch arm 57 is moved out of engagement with the contact 58 and opening movement of the valve 16 is stopped. In this manner the valve 16 is modulated toward an open position in direct accordance with the decrease in space temperature.

Upon an increase in space temperature the slider 51 moves to the right in the direction indicated by the character H and this right-hand movement causes partial short-circuiting of the relay coil 54 to decrease the energization thereof and increase the energization of the relay coil 55. The switch arm 57 is thereupon moved into engagement with the contact 59 to complete a circuit from the line wire 62 through wire 79, switch arm 57, contact 59, wire 83, limit switch 35, wire 84, field winding 33, and wire 82 back to the other line wire 63. Completion of this circuit energizes the field winding 33 to move the valve 16 towards a closed position to decrease the supply of heat to the space. Operation of the motor 13 to move the valve 16 towards a closed position causes left-hand movement of the slider 43 of the balancing potentiometer. This left-hand movement of the slider 43 partially short-circuits the relay coil 55 to decrease the energization thereof and increase the energization of the relay coil 54. When the slider 43 has moved sufficiently far to the left to rebalance the energizations of the relay coils 54 and 55 the switch arm 57 is moved out of engagement with the contact 59 to stop opening movement of the valve 16. In this manner the valve 16 is modulated towards a closed position in direct accordance with the amount of increase in space temperature.

By reason of the above construction a true follow-up system is provided for modulating the valve 16 in accordance with deviation in space temperature. It is found that in this type of follow-up control system if the control range of the control potentiometer is made sufficiently narrow so as to give an accurate temperature control "hunting" of the control system is likely to occur. If the control range of the control potentiometer is made sufficiently wide to prevent "hunting" a "droop" becomes noticeable, that is, the temperature maintained in the space is lower when the heating load is relatively great than when the heating load is relatively light. In order to eliminate the "droop" of the follow-up system and still prevent "hunting" of the system the reset mechanism generally designated at 15 is utilized.

Opposed levers 88 and 89 are pivoted to the plate 47 by pivots 90 and 91. The plate 47 carries an abutment 92 between the levers 88 and 89 and the levers 88 and 89 are held in engagement with the abutment 92 by means of a tension spring 93. Also interposed between the levers 88 and 89 is a lug 94 carried by the lever 40. The spring 93 and the levers 88 and 89 operate on the lug 94 to bias the slider 43 to the mid position with respect to the resistance element 44. When the slider 43 is moved to the right the lug 94 carried by the lever 40 forces the lever 88 outwardly and increases the tension in the spring 93. The spring then acts through the lever 89 and lug 92 to rotate the plate 47 to center the resistance element 44 with respect to the slider 43. Conversely, when the slider 43 is moved to the left the lug 94 moves the lever 89 outwardly to tension the spring 93. The spring 93 acts through the lever 88 and the lug 92 to rotate the plate 47 in the opposite direction to center the resistance element 44 with respect to the slider 43. In this manner regardless of what the position of the slider 43 of the balancing potentiometer may be, the spring 93 and the levers 88 and 89 always tend to center the resistance element 44 with respect to the slider 43.

Means are provided for retarding the biasing action of the spring 93 in order to provide the correct reset action. In carrying out this retarding action the plate 47 is provided with a plurality of teeth 96 which are engaged by a pinion 97 carried by a shaft 98. The shaft 98 is connected through a gear train 99 to a shaft 100. The shaft 100 may be suitably journaled in a supporting plate 101. A collar 102 is rigidly secured to the shaft 100 by a set screw 103 and a second collar 104 is loosely mounted on the shaft 100. The collars 102 and 104 are connected together by spring arms 106 which carry suitable governor weights 107. The collars 102 and 104, the spring arms 106 and the weights 107 form a ball governor. When the spring 93 is tensioned by the operation of the slider 43 of the balancing potentiometer a turning effort is applied to the shaft 98 and consequently the shaft 100 is rotated. The weights 107 fly out in accordance with the speed of rotation of the shaft 100 to move the movable collar 104 to the right. Therefore, the collar 104 is moved to the right in direct accordance with the speed of rotation of the shaft 100.

The collar 104 is provided with a flange 105 to form a braking surface for a brake shoe 109. The brake shoe 109 is carried by a spring arm 110 suitably secured to a lever 111. The lever 111 is pivoted intermediate its length on a bracket 112. The bracket 112 is clamped to the supporting plate 101 by a screw 113. The supporting plate 101 is provided with a slot 114 (Fig. 2) to allow adjustment of the bracket 112 whereby the pivot point of the lever 111 is adjusted longitudinally with respect to the lever 111. A stud 115 is screw threaded into the lever 111 and abuts the spring arm 110. The stud 115 extends outwardly through a suitable opening in the supporting plate 101 and is provided at its outward end with a head 116. A spring 117 is interposed between the head 116 and a washer 118 which abuts the supporting plate 101. The spring 117 therefore urges the lever 111 in a clockwise direction to urge the brake shoe 109 into engagement with the braking surface 105. By suitably rotating the stud 115 the relation between the brake shoe 109 and the braking surface of the flange 105 may be adjusted. This adjustment is utilized for varying the rate of reset of the reset mechanism.

Preferably the brake shoe 109 is positioned as an incident to the deviation of the space temperature from the desired normal value. Stated in another way, the brake shoe 109 is adjusted or positioned in accordance with the relative positions of the slider 43 and the resistance element 44 forming the balancing potentiometer. In order to accomplish this adjustment of the brake shoe 109 the lever 111 is suitably connected to a bracket 120 which is pivoted by means of a pivot 121 to a collar 122 loosely mounted on the shaft 41. Collar 122 abuts a shoulder 123 rigidly secured to or formed integral with the plate 47. The spring 117 which urges the lever 111 in a clockwise direction also urges the collar 122 into engagement with the shoulder 123. The plate 47 is provided with another lug 126 spaced diametrically opposite the lug 92. The lugs 92 and 126 have concave surfaces which are engaged by lugs 127 and 128 carried by the lever 40. Since the lever 40 is rigidly secured to the shaft 41 and since longitudinal movement of the shaft 41 is prevented by the support 124 the lugs 92 and 126 carried by the plate 47 are held in engagement with the lugs 128 and 127 carried by the lever 40. Stated in another way, the spring 117 urges the lever 111 in a clockwise direction to urge the collar 122 into engagement with the shoulder 123 to urge the lugs 92 and 126 into engagement with the lugs 128 and 127.

Assume now that the slider 43 is in a mid position with respect to the balancing resistance element 44 and therefore the lugs 127 and 128 are in the mid position with respect to the lugs 126 and 92, and as a result the brake shoe 109 is in engagement with the flange 105. When the slider 43 moves to the right the lugs 127 and 128 ride up the cam surface of the lugs 126 and 92 to force the plate 47 to the left longitudinally of the shaft 41. The shoulder 123 carried by the plate 47 thereupon moves the collar 122 to the left to rotate the lever 111 in a counterclockwise direction about its pivot 112. This moves the brake shoe 109 to the right away from the flange 105. Movement of the slider 43 to the right also moves the lever 88 away from the lug 92 to cause rotation of the shaft 100. Rotation of the shaft 100 causes the weights 107 of the ball governor to fly outwardly to move the flanges 105 into engagement with the brake shoe 109. In this manner the speed of rotation of the shaft 100 is regulated by the brake shoe 109 in direct accordance with the amount of right-hand movement of the slider 43 with respect to the resistance element 44. The further that the slider 43 is moved to the right with respect to the resistance element 44 the faster the shaft 100 operating the ball governor will rotate and therefore the faster the plate 47 is moved to center the resistance element 44 with respect to the slider 43. The mechanism operates in exactly the same way for left-hand movement of the slider 43 with respect to the resistance element 44 and therefore a further description is not considered necessary.

By rotating the stud 115 to adjust the brake shoe 109 with respect to the flange 105 the speed of rotation of the governor and therefore the speed at which the resistance element 44 is centered with respect to the slider 43 may be adjusted. By moving the bracket 112 which forms the pivot for the lever 111 upwardly or downwardly the amount that the brake shoe 109 is adjusted for a given movement of the slider 43 may be adjusted.

Assume now the parts in the position shown in Figure 1, the complete operation of the follow-up control system in conjunction with the reset mechanism is as follows: Upon an increase in the heating load the space temperature decreases to move the slider 51 of the control potentiometer to the left in the direction indicated by the character C. This decreases the energization of the relay coil 55 and increases the energization of the relay coil 54 whereupon the valve 16 is moved towards a closed position and the slider 43 of the balancing potentiometer is moved to the right to rebalance the relay 12. The valve 16 is therefore modulated towards an open position in accordance with the amount of decrease in space temperature. Movement of the slider 43 to the right swings the lever 88 outwardly and also moves the brake shoe 109 to the right. The spring 93 causes rotation of the ball governor and of the plate 47 to move the resistance element 44 to the right with respect to the slider 43, the rate of such movement being controlled by the brake shoe 109. Movement of the resistance element 44 to the right decreases the energization of the relay coil 55 and increases the energization of the relay coil 54 to move the valve 16 further towards an open position and to move the slider 43 further towards the right. This causes further operation of the ball governor and further movement of the resistance element 44 to the right with respect to the slider 43 of the balancing potentiometer. In this manner the valve 16 is moved further towards an open position as long as the space temperature is less than the desired normal value. When the space temperature is restored to the desired normal value as a result of this increased opening movement of the valve 16, the valve 16 will be repositioned or reset with respect to the value of the space temperature. The amount that the valve 16 is so reset is in accordance with the amount of increase in the heating load.

Upon a decrease in the heating load the space temperature increases and the slider 51 moves to the right in the direction indicated by the character H. This decreases the energization of the relay coil 54 and increases the energization of the relay coil 55 whereupon the valve 16 is moved towards a closed position and the slider 43 of the balancing potentiometer is moved towards the left to rebalance the relay 12. In this manner the valve 16 is moved towards a closed position in accordance with the amount of increase in space temperature. Movement of the slider 43 to the left swings the lever 89 outwardly to cause rotation of the ball governor and also move the brake shoe 109 to the right. Operation of the ball governor causes rotation of the plate 47 and left-hand movement of the resistance element 44. The rate at which the resistance element 44 moves to the left is regulated by the brake shoe 109. Movement of the resistance element 44 to the left decreases the energization of the relay coil 54 and increases the energization of the relay coil 55 to further move the valve 16 towards a closed position. In this manner the valve 16 will be continued in its closing movement as long as the space temperature is greater than the desired normal value and the rate at which the valve 16 is closed is controlled by the ball governor. When the space temperature returns to the desired normal value as a result of this additional decrease in the supply of heat to the space the relay 12 becomes rebalanced and the valve 16 is held in its newly adjusted position. In this manner the valve 16 is adjusted or reset toward a closed position in accordance with the amount of decrease in the heating load.

The rate at which the valve 16 is additionally moved toward its open or closed position in accordance with changes in the heating load may be adjusted by manually manipulating the stud 115. Also by reason of the brake 109 being adjusted in accordance with the relative positions of the slider 43 and the resistance element 44 of the balancing potentiometer, the valve 16 is reset or repositioned at a faster rate when the space temperature has deviated a relatively great amount than when the space temperature has deviated from the desired normal value a lesser amount. Stated in another way, the rate of reset is dependent upon the amount of deviation of the space temperature.

From the above it is seen that we have provided a follow-up control system for controlling the value of a condition along with a new and novel reset mechanism associated with the follow-up means of the control system whereby the condition to be controlled is maintained at a constant value regardless of changes in the load. Further, the rate of reset of the device which controls the value of the condition increases as the value of the condition deviates from the desired normal value. Also provision is made for manually adjusting the rate of reset for any given deviation of the condition from the desired normal value.

Although for purposes of illustration we have disclosed one form of our invention, other forms thereof may become obvious to those skilled in the art upon reference to this specification, and therefore this invention is to be limited only by the scope of the appended claims and prior art.

We claim as our invention.

1. In combination, a device to be positioned in a plurality of positions for controlling the value of a condition, control means the state of which is varied in accordance with changes in the value of the condition to be controlled and having a normal state corresponding to a desired normal value of the condition, means, including follow-up means operated by said device, controlled by said control means for positioning said device in accordance with changes in the value of the condition, and a ball governor and brake arrangement operatively associated with the follow-up means for altering the action thereof to cause said device to be positioned differently with respect to the value of the condition to be controlled.

2. In combination, a device to be positioned in a plurality of positions for controlling the value of a condition, control means the state of which is varied in accordance with changes in the value of the condition to be controlled and having a normal state corresponding to a desired normal value of the condition, means, including follow-up means operated by said device, controlled by said control means for positioning said device in accordance with changes in the value of the condition, said follow-up means comprising a member and an element movable with respect thereof, resilient means for biasing said member to a given position with respect to said element, means operated by said device for moving said element with respect to said member, and means including a ball governor for retarding the biasing action of the resilient means.

3. In combination, a device to be positioned in a plurality of positions for controlling the value of a condition, control means the state of which is varied in accordance with changes in the value of the condition to be controlled and having a normal state corresponding to a desired normal value of the condition, means, including follow-up means operated by said device, controlled by said control means for positioning said device in accordance with changes in the value of the condition, said follow-up means comprising a member and an element movable with respect thereto, resilient means for biasing said member to a given position with respect to said element, means operated by said device for moving said element with respect to said member, a ball governor for retarding the biasing action of the resilient means, and an adjustable brake for controlling the retarding action of the ball governor arrangement.

4. In combination, a device to be positioned in a plurality of positions for controlling the value of a condition, control means the state of which is varied in accordance with changes in the value of the condition to be controlled and having a normal state corresponding to a desired normal value of the condition, means, including follow-up means operated by said device, controlled by said control means for positioning said device in accordance with changes in the value of the condition, said follow-up means comprising a member and an element movable with respect thereto, resilient means for biasing said member to a given position with respect to said element, means operated by said device for moving said element with respect to said member, a ball governor for retarding the biasing action of the resilient means, a brake for controlling the retarding action of the ball governor arrangement, and means operated as an incident to deviation of the value of the condition to be controlled from the desired normal value for adjusting said brake.

5. In combination, a device to be positioned in a plurality of positions for controlling the value of a condition, control means the state of which is varied in accordance with changes in the value of the condition to be controlled and having a normal state corresponding to a desired normal value of the condition, means, including follow-up means operated by said device, controlled by said control means for positioning said device in accordance with changes in the value of the condition, said follow-up means comprising a member and an element movable with respect thereto, resilient means for biasing said member to a given position with respect to said element, means operated by said device for moving said element with respect to said member, a ball governor for retarding the biasing action of the resilient means, a brake for controlling the retarding action of the ball governor arrangement, and means operated by said device for adjusting said brake.

6. In combination, a device to be positioned in a plurality of positions for controlling the value of a condition, adjustable control impedance means adjusted in accordance with changes in the value of the condition to be controlled, adjustable balancing impedance means adjusted by said device, means controlled by said control impedance means and said balancing impedance for positioning said device in accordance with changes in the value of the condition, and means including a ball governor arrangement operatively associated with the follow-up means for altering the action thereof to cause said device to be positioned differently with respect to the value of the condition to be controlled.

7. In combination, a device to be positioned in a plurality of positions for controlling the value of a condition, adjustable control impedance means adjusted in accordance with changes in the value of the condition to be controlled, adjustable balancing impedance means adjusted by said device, means controlled by said control impedance means and said balancing impedance for positioning said device in accordance with changes in the value of the condition, said balancing impedance means including a member and an element movable with respect to each other, resilient means for biasing said member to a given position with respect to said element, means operated by said device for moving said element with respect to said member, and means including a ball governor for retarding the biasing action of the resilient means.

8. In combination, a device to be positioned in a plurality of positions for controlling the value of a condition, adjustable control impedance means adjusted in accordance with changes in the value of the condition to be controlled, adjustable balancing impedance means adjusted by said device, means controlled by said control impedance means and said balancing impedance for positioning said device in accordance with changes in the value of the condition, means including a ball governor arrangement operatively associated with the follow-up means for altering the action thereof to cause said device to be positioned differently with respect to the value of the condition to be controlled, and means for adjusting the ball governor arrangement.

9. In combination, a device to be positioned in a plurality of positions for controlling the value of a condition, adjustable control impedance means adjusted in accordance with changes in the value of the condition to be controlled, adjustable balancing impedance means adjusted by said device, means controlled by said control impedance means and said balancing impedance for positioning said device in accordance with changes in the value of the condition, said balancing impedance means including a member and an element movable with respect to each other, resilient means for biasing said member to a given position with respect to said elements, means operated by said device for moving said element with respect to said member, a ball governor for retarding the biasing action of the resilient means, and an adjustable brake for controlling the retarding action of the ball governor arrangement.

10. In combination, a device to be positioned in a plurality of positions for controlling the value of a condition, adjustable control impedance means adjusted in accordance with changes in the value of the condition to be controlled, adjustable balancing impedance means adjusted by said device, means controlled by said control impedance means and said balancing impedance for positioning said device in accordance with changes in the value of the condition, said balancing impedance means including a member and an element movable with respect to each other, resilient means for biasing said member to a given position with respect to said element, means operated by said device for moving said element with respect to said member, a ball governor for retarding the biasing action of the resilient means, a brake for controlling the retarding action of the ball governor arrangement, and means operated as an incident to deviation of the value of the condition to be controlled from the desired normal value for adjusting said brake.

11. In combination, a device to be positioned in a plurality of positions for controlling the value of a condition, adjustable control impedance means adjusted in accordance with changes in the value of the condition to be controlled, adjustable balancing impedance means adjusted by said device, means controlled by said control impedance means and said balancing impedance for positioning said device in accordance with changes in the value of the condition, said balancing impedance means including a member and an element movable with respect to each other, resilient means for biasing said member to a given position with respect to said element, means operated by said device for moving said element with respect to said member, a ball governor for retarding the biasing action of the resilient means, a brake for controlling the retarding action of the ball governor arrangement, and means operated by said device for adjusting said brake.

12. In combination, a device to be positioned in a plurality of positions for controlling the value of a condition, an adjustable control potentiometer adjusted in accordance with changes in the value of the condition to be controlled, an adjustable balancing potentiometer adjusted by said device, means controlled by said control potentiometer and said balancing potentiometer for positioning said device in accordance with changes in the value of the condition, said balancing potentiometer including a member and an element movable with respect to each other, resilient means for biasing said member to a given position with respect to said element, means operated by said device for moving said element with respect to said member, and means including a ball governor for retarding the biasing action of the resilient means.

13. In a reset mechanism for a device which controls the value of a condition, the combination of a member, an element movable with respect to the member for performing a control function, resilient means for biasing the member to a given position with respect to the element, means operated by the device for moving the element with respect to the member, and means including a ball governor acting upon the member to retard the biasing action of the resilient means.

14. In a reset mechanism for a device which controls the value of a condition, the combination of a member, an element movable with respect to the member for performing a control function, resilient means for biasing the member to a given position with respect to the element, means operated by the device for moving the element with respect to the member, means including a ball governor acting upon the member to retard the biasing action of the resilient means, and means operated by said device for adjusting the ball governor.

15. In a reset mechanism for a device which controls the value of a condition, the combination of a member, an element movable with respect to the member for performing a control function, resilient means for biasing the member to a given position with respect to the element, means operated by the device for moving the element with respect to the member, a ball governor acting upon the member to retard the biasing action of the resilient means, a brake for adjusting the speed of rotation of the ball governor, and means operated by said device for adjusting said brake.

16. In a reset mechanism for a device which controls the value of a condition, the combination of a member, an element movable with respect to the member for performing a control function, resilient means for biasing the member to a given position with respect to the element, means operated by the device for moving the element with respect to the member, a ball governor acting upon the member to retard the biasing action of the resilient means, a brake for adjusting the speed of rotation of the ball governor, means operated by said device for adjusting said brake, and means for manually adjusting said brake.

FREDERICK S. DENISON.
ALBERT E. BAAK.